Aug. 14, 1956    H. A. HERZOG ET AL    2,758,732
CONVEYING AND UNLOADING MECHANISM
Filed Jan. 12, 1953    5 Sheets-Sheet 1
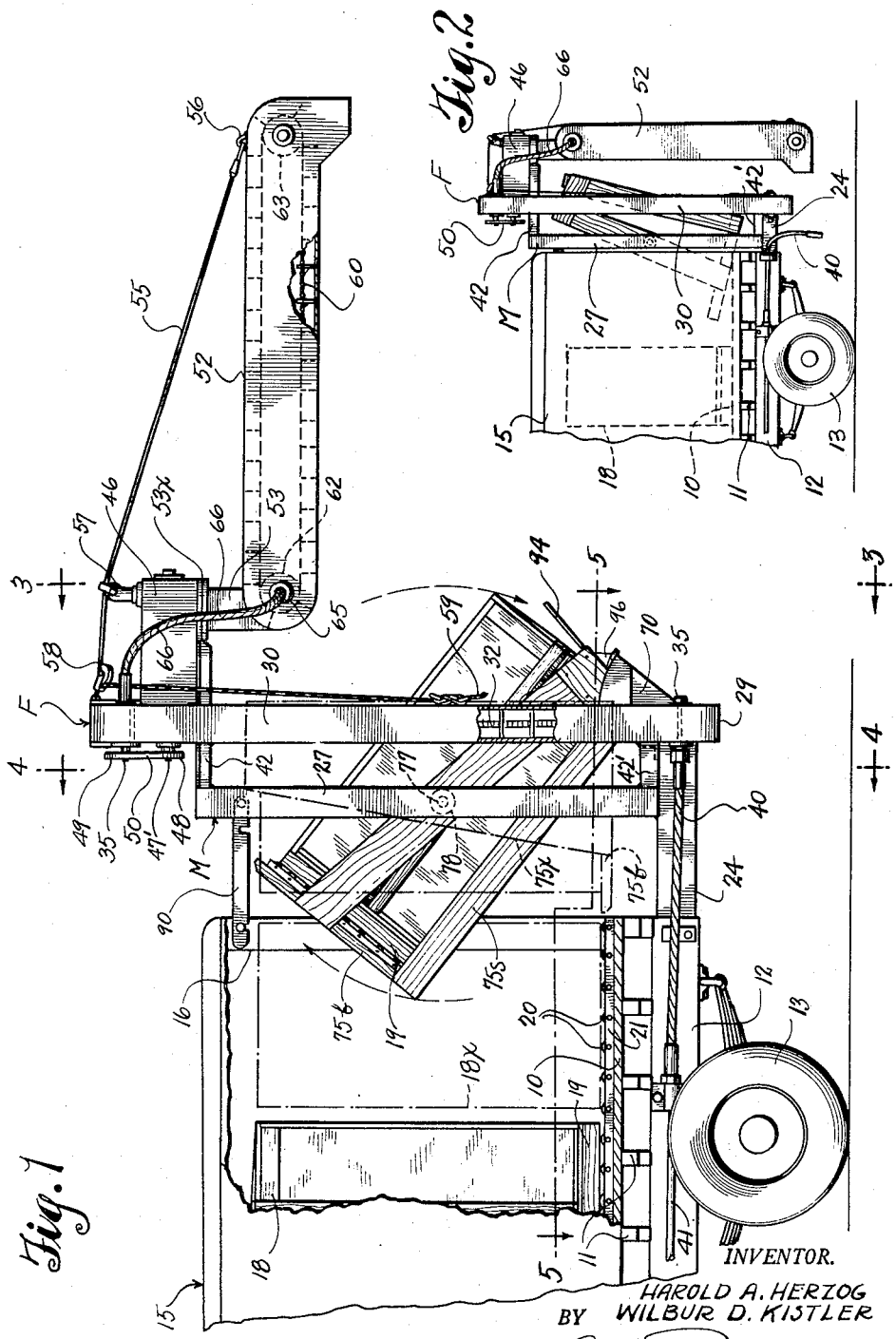
INVENTOR.
HAROLD A. HERZOG
WILBUR D. KISTLER
BY
Cook & Robinson
ATTORNEYS Aug. 14, 1956  H. A. HERZOG ET AL  2,758,732
CONVEYING AND UNLOADING MECHANISM
Filed Jan. 12, 1953  5 Sheets-Sheet 2
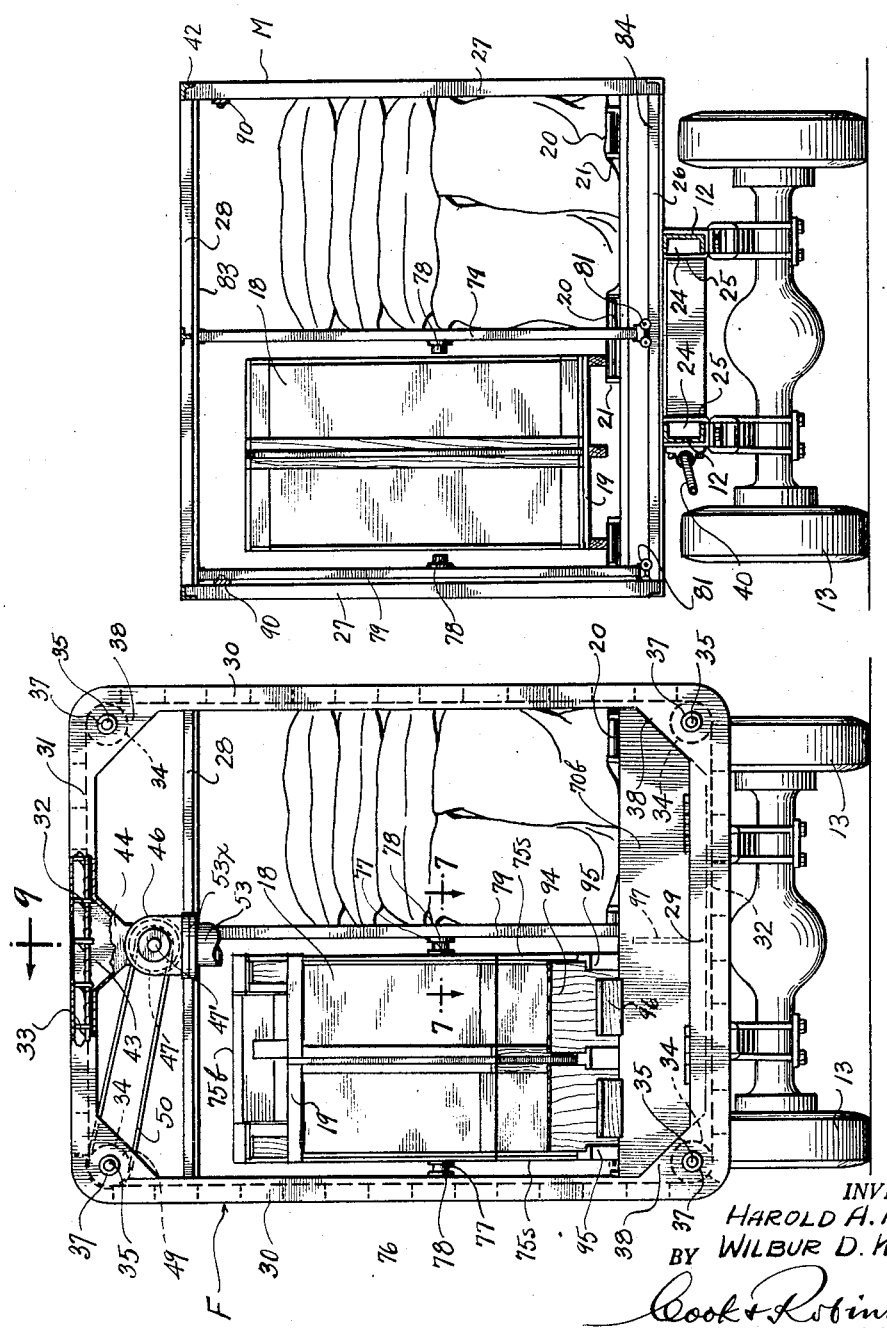
INVENTOR.
HAROLD A. HERZOG
BY WILBUR D. KISTLER
Cook & Robinson
ATTORNEYS

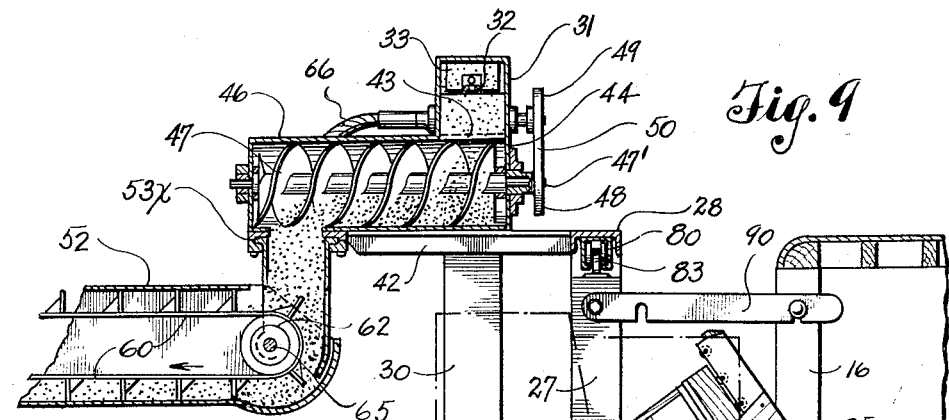
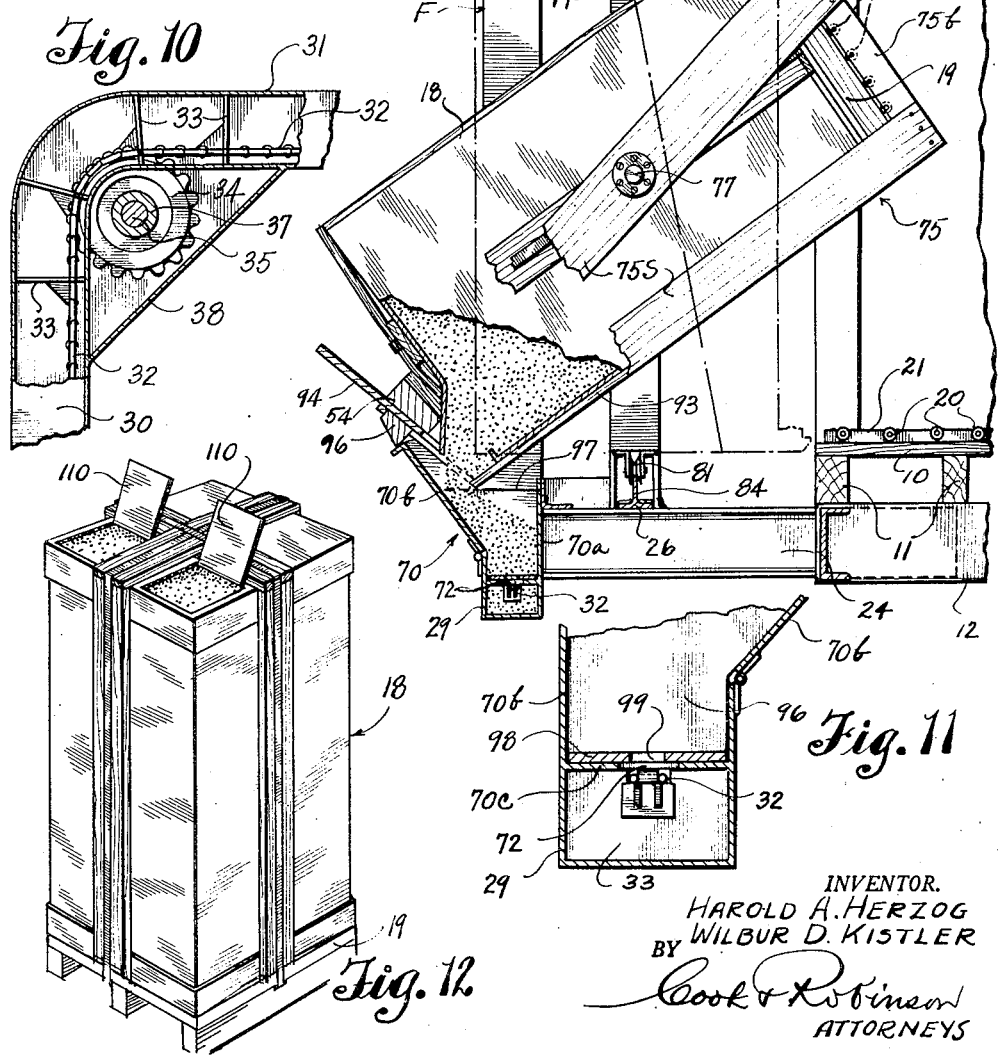

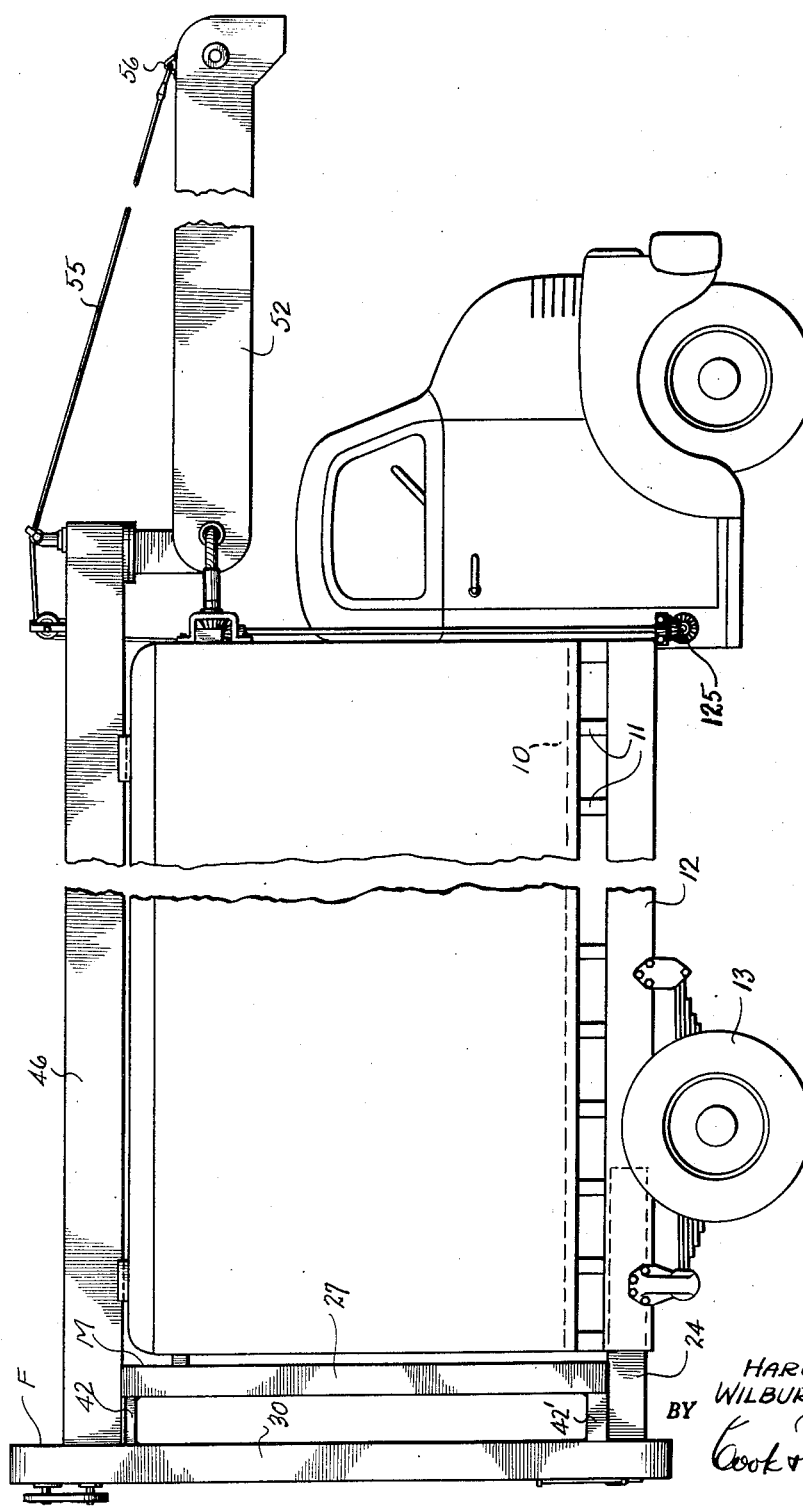

United States Patent Office 2,758,732
Patented Aug. 14, 1956

2,758,732
CONVEYING AND UNLOADING MECHANISM

Harold A. Herzog, Mercer Island, and Wilbur D. Kistler, Seattle, Wash., assignors to Fisher Flouring Mills Co., Seattle, Wash.

Application January 12, 1953, Serial No. 330,752

10 Claims. (Cl. 214—314)

This invention relates to power operated unloading mechanisms as applied to automobile trucks and the like. More particularly, the invention has reference to mechanism that may be easily and readily applied to the ordinary types of freight hauling automobile trucks and is operable for the unloading of such bulk materials as feed and grain from the truck directly to a storage area, bin or receptacle.

In times past it has been a general practice to deliver such materials as poultry and animal feeds, grain, seeds, fertilizers, sugar seconds and the like in sacks, from the mills, factories or warehouses to place of use. More recently it has become a common practice to deliver these materials in bulk in closed truck bodies. There are many advantages residing in this recent practice of bulk delivery of such materials. Also, there are some disadvantages, arising principally from the problems of unloading. This is especially true when it is not possible for the materials to be unloaded by gravity flow or by merely dumping them direct from the truck. Unloading difficulties are increased if the material has to be elevated from the truck for delivery to a storage area.

It is a further point of consideration that trucks as heretofore designed for the handling of feed or grain in bulk, are usually not practical for the handling of materials in other forms, such as miscellaneous freight, sacked goods or farm implements. Therefore such trucks are generally classed as one job vehicles, and their value thus becomes limited.

In view of the foregoing remarks, it has been the principal object of the present invention to provide an apparatus that is readily applicable to the common types of trucks either as a permanent part or as a detachable apparatus, and which comprises a hopper, a dumping cradle whereby truck conveyed bins or boxes of feed, grain or like material can be dumped into the hopper without removal from the truck, and a means for mechanically elevating the material from the hopper and delivering it to a place of storage which may be above, below or laterally of the truck. Furthermore, to so design and apply the apparatus that it will not prevent ready access to and from the body in loading the same with the bins or containers of the feed or grain, or in the loading or unloading of the vehicle with various other articles.

It is a further object of the present invention to provide mechanism of the above stated kind wherein a bin dumping cradle is associated with a receiving hopper, and means is provided for the automatic release of material from the bin for flow into the receiving hopper after the bin has been swung to a proper unloading or dumping position.

Still another object of the invention is to provide the present apparatus with an elevating and conveying mechanism that discharges the material therefrom into a swing spout containing a conveyor mechanism for the delivery of materials to a remote point of storage.

Further objects of the present invention reside in the combination of the various parts of the present mechanism with a truck body, and for the making of the required adjustments between the normal operating position and a retracted position for travel of the truck if such should be desired.

Still further objects of the invention are to be found in the details of construction and in the combination of parts of the various elements of the mechanism.

In accomplishing these and other objects of the invention, we have provided the improved details of construction, the preferred forms of which are illustrated in the accompanying drawings, wherein—

Fig. 1 is a side view of an automobile truck body with the mechanism of the present invention functionally attached thereto; this view showing the mechanism adjusted rearwardly to "operating position" relative to the truck body.

Fig. 2 is a similar view, but at a reduced scale, showing the mechanism as adjusted forwardly to "traveling position."

Fig. 3 is a transverse, vertical section, taken substantially on the line 3—3 in Fig. 1, showing the bin dumping cradle in dumping position.

Fig. 4 is a transverse, vertical section taken substantially on the line 4—4 in Fig. 1, the dumping cradle being removed.

Fig. 5 is a horizontal section taken on line 5—5 in Fig. 1, the cradle being removed from between its supports.

Fig. 6 is a perspective view of the bin dumping cradle.

Fig. 7 is an enlarged sectional detail taken substantially on line 7—7 in Fig. 3 showing one of the mounting trunnions of the bin dumping cradle as applied to its bearing.

Fig. 8 is a vertical cross-section on the line 8—8 in Fig. 7.

Fig. 9 is a vertical section taken substantially on line 9—9 in Fig. 3, particularly showing the bin dumping operation of the cradle, the hopper and conveyor mechanism.

Fig. 10 is an elevation of a part of the conveyor duct and conveyor, a portion of the duct being broken away for better showing of enclosed parts.

Fig. 11 is an enlarged cross-section of the lower portion of the hopper and conveyor duct.

Fig. 12 is a perspective view of one of the presently used shipping bins.

Fig. 13 is a side view of a truck equipped with an unloading mechanism of an alternative form of construction.

The present apparatus comprises several essential elements, namely, a hopper, a means for dumping the contents of the bins into the hopper, a conveyor system, and means for the delivery of material from the hopper to the conveyor system for its delivery thereby into a storage area; this apparatus being mounted on the bin conveying vehicle and preferably, but not essentially, powered by the engine of the vehicle.

Manifestly there are various ways of supporting this mechanism from the vehicle, and various ways in which the material can be conveyed to the storage area. Therefore, the present apparatus is intended to be representative of the various forms and designs that are possible. While the drawings illustrate to greatest extent a conveyor for rear delivery of material it is not to be construed that the mechanism for front delivery, as illustrated in Fig. 13, is of any less importance.

Referring more in detail to the drawings—

In Figs. 1 and 2, is shown the rear end portion of a common type of automobile truck having a bed 10 supported by cross beams 11 mounted on the longitudinally extending opposite side beams 12—12 of the truck chassis;

the chassis being mounted in the usual way on wheels such as designated at 13. The truck shown is typical of those kinds usually used for the highway transportation of freight and the like, and it is here shown to be equipped with an enclosed body, designated generally by reference character 15. This truck body structure includes the vertical rear end corner posts 16—16 shown in Figs. 1, 2 and 9 to which reference is later made.

The present mechanism, as applied to the truck, includes a cradle adapted to receive therein, and to dump large rectangular bins of material, to cause the material to be discharged into a receiving hopper that is incorporated in the mechanism below the level of the truck floor.

One of these bins, designated in its entirety by numeral 18, is shown in perspective view in Fig. 12 as bound for shipment. This bin per se is the subject matter of an application filed by Harold A. Herzog, on January 2, 1952, under Serial No. 264,600, and is not herein described in detail. Bins of other kinds may also be used, provided that their construction permits handling and dumping in a manner consistent with this invention. Bins presently being used are about thirty-five inches square in horizontal dimensions and approximately five feet high and when filled with feed or grain will weigh about one ton. It is customary in making such a bin, to place it on a pallet, such as that designated at 19, which may comprise a part of its frame structure. The bins preferably are mounted in the truck on rollers 20 carried in suitable frames 21, as seen in Fig. 9, or in the bed 10 of the truck, to facilitate easy movement of the bins from the truck bed into the bin dumping cradle as presently explained.

The present bin dumping and material elevating equipment is best shown in Figs. 1, 2 and 3 to comprise a main frame structure having a pair of parallel and horizontally disposed supporting base beams 24—24, extended rearwardly from the truck chassis. These are slidably mounted in guides 25 and 25 fixed by suitable means to the vehicle chassis as observed in Fig. 5, or fixed to the bed of the truck in any suitable manner, and they are adapted to be moved endwise thus to shift the mechanism, as supported thereon, between the retracted or "traveling position" in which it is shown in Fig. 2, and the "operating position" in which it is shown in Figs. 1 and 9.

If it is desired, the frame structure could be permanently fixed in a like manner, or in any other suitable manner to the truck chassis or body.

The main frame structure of the present mechanism comprises a vertical, transversely disposed rectangular frame M which is shown best in Fig. 4 to comprise a horizontal base beam 26, that is fixed rigidly upon the two supporting base beams 24—24, to extend equally to opposite sides thereof; opposite side beams 27—27 that are fixed at their lower ends to the opposite ends of the cross beam 26, and a horizontal top beam 28 that joins the upper ends of the side beams 27—27. The rectangular frame thus formed by the parts 26, 27—27 and 28, has a width and height that is substantially equal to the width and height of the truck body.

Disposed rearwardly of the rectangular frame structure above described, parallel thereto and also rigidly supported upon the base beams 24—24, at their rearward ends, is a rectangular frame structure F best shown in Fig. 3 to comprise a transversely directed horizontal base portion 29, vertical opposite side portions 30—30 and a horizontal upper end portion 31 joined at its ends to the upper ends of the parts 30—30. All of the parts of this frame F are tubular, and rectangular in cross section as seen in Figs. 5 and 9 and they provide a continuous tubular duct containing a continuous chain conveyor belt 32 designed for the movement of material therein. As seen best in Figs. 10 and 11, the chain belt 32 is equipped at close intervals with flights or drags 33, closely fitting the inside dimensions of the duct, for the positive conveyance therein of the material. The chain belt operates at the four corners of this rectangular duct, about sprocket wheels 34 rotatably supported by mounting shafts 35; these shafts being mounted in suitable bearings 37 secured in web plates 38 that are applied to the opposite sides of the corner portions of the structure to give strength and rigidity thereto. One of the shafts 35 is driven as a means of driving the conveyor belts. In Fig. 3, this is shown to be the lower, left hand shaft, and this has a flexible driving connection, designated at 40 in Fig. 1, with a power take-off shaft 41 extended along and at one side of the chassis of the vehicle. This power take off may be connected at any suitable way with the vehicle engine. Alternatively, a separate small engine could be employed for this purpose with direct or indirect driving connection with shaft 35.

The rectangular frame F, as seen in Fig. 3, is substantially of the same width as the rear end opening of the truck body, but it extends somewhat above the level of the top of the truck, as seen in Fig. 1. The two rectangular frame structures, M and F, are rigidly joined together by connecting bars such as those shown at 42 and 42' in Figs. 1 and 9.

Between its opposite ends, the upper cross member 31 of the tubular frame F is formed in its lower wall with an elongated discharge slot 43 which is shown in Fig. 9 to open into a hopper 44. The hopper is fixed to or formed as a part of the upper cross-member of the frame and it discharges into a rearwardly directed tubular duct 46 containing a conveyor, here shown to be a rotatably driven feed screw 47. The drive shaft 47' of the screw has a sprocket 48 fixed thereon in alignment with a sprocket wheel 49 on the mounting shaft 35 of the sprocket wheel 34 at the upper left hand corner of the tubular duct, as seen in Fig. 3. A chain belt 50 operates about the sprocket wheels 48, 49 to drive the feed screw which operates to deliver material received from the hopper to an elongated and adjustable discharge spout 52.

The spout 52 is attached by a swivel fitting 53 to the housing 46 for universal adjustment.

As indicated best in Fig. 1, the spout 52 is equipped with an adjusting cable 55, attached at one end to the outer end of the spout, as at 56, and extended therefrom and over a fair lead sheave 57 on the duct 46, then through a pulley block 58 mounted on the upper end of one of the side legs of the tubular duct frame F, and downwardly to a hand winch 59 mounted on the truck frame not shown. By means of this winch and cable, the swing spout 52 can be raised or lowered to any position of use within its limits of vertical adjustment, and there secured. Also provision is made for swinging the outer end of duct 52 horizontally, and this is by providing the upper end of the part 53 with a swivel mounting, as shown at 53x in Fig. 9 for turning about a vertical axis.

It is further shown in Figs. 1 and 9 that a continuous conveyor chain 60 operates in the spout for the conveyance of material as received from the duct 46, to the discharge end of the spout 52. This chain operates over sprocket wheels 62 and 63 mounted at the receiving and discharge ends of the spout; the wheel 62 being mounted on a drive shaft 65 which is operatively connected by means of a flexible shaft 66 with the mounting shaft 35 of one of the upper sprocket wheels 34 over which the conveyor belt 32 operates, this being shown in Fig. 1.

The feed or grain that is transported by the truck in the large bins or boxes 18 is dumped into a receiving hopper 70 that is mounted on and extends along the lower horizontal member 29 of the rectangular frame F. As shown in cross-section in Fig. 9, this hopper comprises a forward vertical wall 70a and a rearwardly and upwardly sloping back wall 70b, higher than the inner wall and extended substantially to the level of the floor of the truck body. The bottom wall 70c of the hopper is formed substantially to its full length with a slot 72 through which material dumped into the hopper may flow, under control as presently explained, into the lower tubular member 29 of the conveyor duct, to be picked up by the conveyor belt 32 and elevated for delivery to the hopper 44 and from this to duct 46 and swing spout 52.

The size of the bins 18 and weight of their contents makes it desirable that suitable mechanical means be provided for their safe and easy dumping, and without their being removed from the truck. For this purpose we provide the bin dumping cradle 75 shown in perspective view in Fig. 6 and also seen in side view, and inverted, in Figs. 1 and 9, and in rear view in Fig. 3. The cradle comprises a horizontal base 75b, of substantially the same dimensions as the base of the bin 18. Fixed rigidly to the opposite sides of the base and extended vertically are opposite side frames 75s—75s; these being equipped, at opposite sides of the cradle, with horizontally aligned trunnions 77—77 for its pivotal suspension. The trunnions are mounted for free turning in bearings 78—78 that are fixed to vertical supporting beams 79—79, as best observed in Fig. 4. The beams 79—79 are equipped at upper and lower ends with suspending and guide rollers 80—81 mounted for travel on horizontal trackways 83 and 84 that are fixed to and extend between the vertical side beams 27—27 of the main frame structure. This permits the cradle 75, which is about half the width of the truck body, to be moved laterally from one side of the body to the other. The base of the cradle is normally at such level that a bin 18, as supported in the truck on the rollers 20, may be moved directly thereonto, as will be understood by reference to the dotted line showing of the bin and cradle in Fig. 1 and preferably it is equipped with rollers, as at 85, for easy movement of the bin into and from the same.

The trunnions of the cradle are so located thereon that when the filled bin is moved into the cradle, the axial line of the trunnions will be substantially through the center of gravity of the bin and it will be well balanced, thus the swinging of the bin from upright receiving position to the inverted or dumping position of Fig. 9 is quite easily accomplished.

It will here be explained that the illustrated rearward adjustment of the present unloading mechanism relative to the truck body as from "traveling position" to "operating position," is provided in order to give ample clearance for the rotating action of the cradle. Adjustment of the mechanism from the operating position of Fig. 1, to the traveling position of Fig. 2 is not necessary adjustment, but is provided in order that travel of the vehicle over rough roadways, when equipped, will be made easier and safer.

In Figs. 1 and 9, connecting links 90 have been shown to be extended between the upper ends of the side members 27—27 of the main frame structure and the corner posts 16—16 of the truck body, to give stability to the frame. Provision is made for use of these links when the device is in either position of adjustment.

It will be noted, in Fig. 6, that the cradle has an upper end wall 92 joined with the side walls. Also, there are back members 93—93 coacting with the side walls and top to retain the bin in the cradle when the latter is tipped or rotated to the dumping position. The upper end wall 92 comprises, as a part thereof, a sliding panel 94 retained by guides 95—95 and this panel is equipped on its outer face with blocks 96—96 so arranged that in the final dumping movement of the cradle they will engage against the top edge of the rear wall 70b of the hopper 70, as shown in Fig. 9, thus to cause the panel to be slid upwardly from closed to an open position. The material in the bin, may then flow therefrom through an outlet provided in the end wall of the bin and the outlet in the cradle wall as provided by the opening of the panel. The material from the bin will flow into the hopper 70, and the bin will be emptied in accordance with the conveyance of material from the hopper by the conveyor chain belt 32. The end wall and the sliding panel 94 prevents any premature discharge of material from the bin during dumping and prior to the bin being brought fully to the position of Fig. 9.

In view of the fact that provision has been made for the dumping of bins into the hopper from either side of the center line of the truck body, it is desirable that the hopper 70 be divided medially of its ends by a cross-partition 97, as shown in Fig. 5. It is desirable also that the rate of flow of material from the hopper to the conveyor chain 32 should be controlled; the rate varying for different materials. For this purpose, we have provided interchangeable plates, such as that shown at 98 in Fig. 11, each of which has a passage 99 of predetermined size to suit the material being conveyed. These plates may be selectively employed by placing them upon the bottom wall of that compartment of the hopper that is to be used. It is noted in Fig. 11 that the passage 99 registers with the longitudinal slot 72 of the underlying bottom wall, but its length would be limited as required to suit the material being conveyed. Ground feed would require a larger or longer outlet 99 than for a free flowing grain.

Assuming the mechanism to be constructed as described, and applied to a truck in the manner illustrated, the mode of its use will be explained.

First, giving consideration to the loading of the truck with bins or containers of the feed or grain: This is best accomplished by removal of the dumping cradle from its normal position of support by lifting its trunnions 77 from the bearings 78—78, and setting it aside. The vertical beams 79 may then both be moved to one side of the entrance to the truck as provided through the two rectangular frames M and F. If it is not desirable or practical to remove the cradle for this operation, it can be shifted to one side, as has been shown in Fig. 3, thus leaving the other side of the entrance to the truck open. After loading, the cradle would then be placed in position, for example as in Fig. 2. In Fig. 4, it has been shown that the bins are disposed at one side of the truck, and sacked materials are contained in the opposite side. This view is merely to illustrate that the equipping of the truck with the present apparatus does not prevent its use for the hauling of other materials.

The bins preferably would be placed in the truck on the rollers 20 for easy advancement onto the cradle for dumping. The position of the cradle for receiving a bin from the truck, and the position of the bin just prior to its being advanced onto the cradle is shown in Fig. 1; the bin being designated in the dash and dot lines at 18x and the cradle is likewise shown in receiving position at 75x.

During transportation of a load, the unloading mechanism is usually disposed at the inward position of adjustment; that being the "traveling position" in which it is shown in Fig. 2. When the unloading point has been reached, the mechanism is adjusted rearwardly to "operating position" thus to afford the necessary clearance for the rotative adjustments of the cradle for dumping. When in either of its positions of adjustment, the structure can be fixed to the truck parts 16—16 by the links 90, as shown in Fig. 1. For short hauls over fairly smooth roadways, the mechanism can be left in its extended position without detriment thereto.

The bin or box of the feed, grain or other material is moved from within the truck directly onto the cradle as in Fig. 1. However, prior to this disposition of the bin in the cradle, a part of its upper end wall is cut free to permit it to swing open, with the inverting of the bin, thus to provide suitable discharge openings such as those shown in Fig. 9 to be provided by the opening of the partly detached sections 110. After the bin has been properly placed in the cradle, the latter is rotated about its supporting trunnions as required to swing the bin to a substantially inverted position. As the cradle approaches the inverted position in which it is seen in Fig. 1, the blocks 96 on the sliding panel 94 engage the top edge of the outer wall 70b of the hopper and the panel is slid to an open position, allowing the detached top portions of the bin to open and the material in the bin to flow therefrom into the hopper 70. From the bottom of the hopper 70, the material flows through the bottom wall slot 72, as restricted by the size of opening 99 in the overlying plate 98, and is moved by the flights of conveyor chain 32 up to the hopper 44 and is discharged therefrom to the feed screw 47, thence to the swing spout 52. The spout may be swung horizontally, lowered or elevated as required, for delivery of the material to a storage area.

When the bin 18 is empty, the cradle may be rotated back to upright position, and the empty bin moved back into the truck body. If it is desired or required, the cradle can be moved from one side of the truck to the other for discharging the empty bin and for receiving the next bin.

A feature of this invention resides in the provision for easy and quick removal of the cradle from the structure merely by removing its trunnions from the supporting bearings which are of the construction seen in Fig. 8. With the cradle removed, unrestricted access is had to the truck between the opposite side members of the main frame structure.

When the truck is traveling on a highway, it is desirable that the swing spout be lowered to position seen in Fig. 2, and better stability is afforded by shifting the whole structure to the position of Fig. 2, close to the end of the truck body.

It is also a feature of the invention as seen in Fig. 1 that the structure is built as a unit, and can be easily and quickly mounted on the truck, or removed therefrom. When removed, the truck is useable for any of the ordinary uses to which trucks are put.

When the mechanism is attached to the truck, the cradle can either be removed entirely to give full width access to the body for loading or unloading or left in place. Even with the cradle in place, ample access for loading or unloading articles is afforded merely by shifting the cradle to one side or the other.

Unloading attachments of this kind have solved many of the problems of handling grain and feed in bulk shipments, especially where it is required that the material be elevated when unloaded; it being understood that the spout 52 might be of any practical length and made in jointed sections if desired.

In accordance with the objects of this invention and the fact that it has been found to be more practical in some operations to employ a front end delivery of material from the hopper, there has been shown, in Fig. 13, a truck with unloading equipment that has a conveyor system leading forwardly.

In this mechanism, all parts at the rear of the truck are substantially like those already described, and will bear the same reference characters, and will not be described in detail. However, the duct 46 here is shown to be elongated, and to extend forwardly instead of rearwardly, over the top of the body and terminates somewhat forwardly thereof. At its forward end it supports the swing spout 52 for lateral swinging and for up and down adjustment at its outer end. The duct 46 and duct 52 would also contain suitable belt or other forms of conveyors for the advancement of the material for discharge.

In this disclosure, the power take-off is at the front end and is designated at 125 and connections as may be provided as required.

While we have described the unloading equipment as being adjustably and removably mounted, it is fully anticipated that it might be permanently attached and nonadjustably secured.

Having thus described our invention, what we claim as new therein, and desire to secure by Letters Patent, is:

1. In combination, a road vehicle of the character described having a load carrying bed adapted for the hauling thereon of containers of free flowing materials, and a material unloading mechanism attached to and portable with said road vehicle; said unloading mechanism comprising a receiving hopper disposed at the unloading end of the bed and below the level thereof, a container dumping cradle mounted on the vehicle at the unloading end of the bed and adapted to individually receive the containers therein directly from the level of the bed and operable to dump them to discharge their contents into the hopper, and a power driven conveyor system associated with the hopper and vehicle and operable to elevate and convey the material therefrom.

2. A combination as recited in claim 1 wherein the receiving hopper is spaced rearwardly from said bed and said cradle is supported between the bed and hopper, and wherein said vehicle bed is equipped with conveying rolls on which the containers are movable into and from the cradle, and said cradle has a base frame equipped with conveyor rolls to receive the containers thereon as moved into the cradle from the bed.

3. A combination as recited in claim 1 wherein the said hopper extends to the full width of the load carrying bed, and is partitioned to provide separate receiving compartments therealong, and wherein the said cradle is mounted for travel along the hopper for controlled dumping of material selectively into the separate compartments.

4. A combination as recited in claim 3 wherein the hopper has a conveyor duct along the bottom thereof, and wherein the power driven conveyor system includes a belt conveyor operable longitudinally of the said duct, and said hopper has a discharge slot in its bottom, opening into the said duct and flow control plates are removably applied within the hopper over the discharge slot thereof; said plates being slotted for passage of material to said discharge slot and to regulate the rate of flow of material from the hopper to the conveyor.

5. In combination; a motor driven road vehicle having a load carrying bed for the conveyance thereon of containers of free flowing materials, a dumping cradle for conveyed containers supported from the said body and adapted to receive said containers singly thereinto directly from said bed, and operable to effect their inversion for rearward dumping of their contents therefrom, and providing after dumping and return to upright position, for the direct removal of the containers therefrom, onto the bed of the vehicle, and an unloading mechanism operatively supported from and portable with the vehicle; said unloading mechanism comprising a hopper that is disposed transversely of the bed, below the level thereof and rearwardly spaced therefrom, to receive material as dumped from containers by the dumping cradle, a power driven conveyor system for conducting material from the base of the hopper to an elevated receptacle and other conveying mechanism arranged to convey the material from the elevated receptacle to a remote point of discharge.

6. A combination as recited in claim 5 wherein the said cradle is supported by and between uprights for rotative movement between an upright position and a container dumping position and which uprights are mounted for travel on horizontal upper and lower trackways directed transversely of the vehicle, thus providing for the shifting of the cradle to one side or the other of the vehicle body.

7. A combination as recited in claim 6 wherein the cradle is equipped at opposite sides with trunnions by which it may be rotatably supported, and wherein said uprights are equipped with bearings adapted to functionally contain the said trunnions therein, and from which bearings the said trunnions may be unseated for removal of the cradle from the uprights; said uprights being independent of each other and adapted to be shifted in either direction on said trackways to clear the passage into and from the body.

8. A combination as recited in claim 1 wherein the cradle has a base on which a container moved thereinto for dumping will rest, and has an upper end wall that will closely overlie the upper end opening of a container placed in the cradle for dumping, and said upper end wall is formed with an outlet through which material from a dumped container will flow into the hopper, and a closure panel slidably mounted on said end wall and normally closed over said outlet, and a contact block on the panel disposed in position to engage with a relatively fixed part of the hopper with the actuation of the cradle to a container dumping position to effect an opening movement of the panel with the final dumping action of the cradle.

9. In combination, a motor driven road vehicle of closed body, flat bed type, adapted for the conveyance of portable containers of free flowing materials therein, and a material unloading mechanism rigidly attached to and portable with the vehicle; said mechanism comprising a frame structure that is fixed to the vehicle, a hopper supported thereby and extended to the full width of the body substantially at the level of the vehicle bed, a continuous conveyor duct of rectangular form, having substantially the same height and width dimensions as the vehicle body, and supported by the frame with its bottom member extending along the bottom of the hopper to receive material directly therefrom its side members extend vertically at opposite sides of the vehicle and joined across their upper ends by a cross leg, a continuous belt conveyor operating in said duct, for the conveyance of material received from the hopper to the upper cross leg of the said duct, a second conveyor arranged to receive material from the upper cross leg of the duct, and to convey it to a remote point of discharge, and a container dumping cradle supported by said frame and adapted to be positioned to individually receive the containers directly thereinto from the vehicle body, and to support and turn them to an inverted position, to discharge their contents into the said hopper, and to return the container to upright position for removal therefrom back into the vehicle body.

10. A combination as recited in claim 9 wherein the second mentioned conveyor system is disposed above the level of the vehicle body and extends to the forward end thereof, and at that end includes an upwardly and downwardly adjustable swing spout.

References Cited in the file of this patent

UNITED STATES PATENTS

| | | |
|---|---|---|
| 1,251,238 | Kern | Dec. 25, 1917 |
| 1,963,288 | Ballert | June 19, 1934 |
| 1,967,683 | Ostrander | July 24, 1934 |
| 2,147,992 | Schau | Feb. 21, 1939 |
| 2,319,588 | Dreese | May 18, 1943 |
| 2,573,193 | Goldsberry | Oct. 30, 1951 |
| 2,597,246 | Kelly | May 20, 1952 |